(12) United States Patent
Jang et al.

(10) Patent No.: US 11,065,783 B2
(45) Date of Patent: Jul. 20, 2021

(54) SILICON INGOT SLICING APPARATUS USING MICROBUBBLES AND WIRE ELECTRIC DISCHARGE MACHINING

(71) Applicant: KOREA INSTITUTE OF ENERGY RESEARCH, Daejeon (KR)

(72) Inventors: Bo-Yun Jang, Daejeon (KR); Joon-Soo Kim, Daejeon (KR); Hui-Chan Moon, Daejeon (KR); Sun-Ho Choi, Gongju-si (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 679 days.

(21) Appl. No.: 15/584,481

(22) Filed: May 2, 2017

(65) Prior Publication Data

US 2018/0133928 A1    May 17, 2018

Related U.S. Application Data

(60) Provisional application No. 62/438,043, filed on Dec. 22, 2016.

(30) Foreign Application Priority Data

Nov. 15, 2016  (KR) ........................ 10-2016-0151719

(51) Int. Cl.
*B28D 5/04* (2006.01)
*B23H 1/08* (2006.01)
(Continued)

(52) U.S. Cl.
CPC ............... *B28D 5/045* (2013.01); *B23H 1/08* (2013.01); *B23H 7/38* (2013.01); *B23Q 11/122* (2013.01);
(Continued)

(58) Field of Classification Search
CPC ... B23H 7/08; B23H 7/02; B23H 7/00; B23H 7/26; B23H 7/36; B23H 5/02; B23H 1/00;
(Continued)

(56) References Cited

U.S. PATENT DOCUMENTS

| 4,193,852 A | * | 3/1980 | Inoue | ...................... B23H 5/06 |
| | | | | 204/209 |
| 4,575,603 A | * | 3/1986 | Inoue | .................... B23H 7/101 |
| | | | | 204/206 |

(Continued)

FOREIGN PATENT DOCUMENTS

| JP | 2002-50596 A | 2/2002 |
| JP | 2014-207250 A | 10/2014 |

(Continued)

OTHER PUBLICATIONS

ChemEd X Video to "Electrolysis of Sodium Nitrate", 2016 (Year: 2016).*

(Continued)

*Primary Examiner* — Phuong T Nguyen
*Assistant Examiner* — Bonita Khlok
(74) *Attorney, Agent, or Firm* — Birch, Stewart, Kolasch & Birch, LLP

(57) ABSTRACT

Provided are a silicon ingot slicing apparatus capable of slicing silicon ingots in various forms such as blocks or wafers using microbubbles and wire electric discharge machining.

9 Claims, 12 Drawing Sheets

(51) Int. Cl.
  *B23H 7/38* (2006.01)
  *B23Q 11/12* (2006.01)
  *B23Q 11/14* (2006.01)
  *B26D 3/28* (2006.01)
  *B26D 7/27* (2006.01)
  *B28D 5/00* (2006.01)
  *B23H 9/00* (2006.01)
  *B23H 7/02* (2006.01)
  *C10N 40/06* (2006.01)
  *C10N 40/22* (2006.01)

(52) U.S. Cl.
  CPC .............. *B23Q 11/145* (2013.01); *B26D 3/28* (2013.01); *B26D 7/27* (2013.01); *B28D 5/0058* (2013.01); *B23H 7/02* (2013.01); *B23H 9/00* (2013.01); *C10N 2040/06* (2013.01); *C10N 2040/22* (2013.01)

(58) Field of Classification Search
  CPC ... B23H 1/08; B23H 1/10; B23H 7/38; B23H 9/00; B28D 5/0058; B28D 5/045; B28D 5/0076; B23Q 11/145; B23Q 11/122; B26D 3/28; C10N 2240/06; C10N 2240/401
  USPC ................... 219/69.14, 69.1–69.12; 438/460
  See application file for complete search history.

(56) References Cited

U.S. PATENT DOCUMENTS

| | | | | |
|---|---|---|---|---|
| 6,344,624 | B1* | 2/2002 | Moro | B23H 7/02 219/69.12 |
| 8,747,625 | B2* | 6/2014 | Wang | B23H 5/06 204/164 |
| 2002/0170829 | A1* | 11/2002 | Kim | B23H 3/00 205/640 |
| 2015/0001182 | A1* | 1/2015 | Kurihara | B23H 9/00 219/69.12 |
| 2016/0016243 | A1* | 1/2016 | Jang | B23H 7/04 204/224 M |

FOREIGN PATENT DOCUMENTS

| | | |
|---|---|---|
| JP | 2016-107365 A | 6/2016 |
| KR | 10-2011-0104994 A | 9/2011 |
| KR | 10-2016-0009816 A | 1/2016 |
| KR | 1020160053825 A | 5/2016 |
| WO | 2012/005344 A1 | 1/2012 |

OTHER PUBLICATIONS

WayBack Machine to ChemEd X Video (Year: 2020).*
Wikipedia page to "Electrochemical Machining" (Year: 2009).*
WayBack Machine to Wikipedia page to "Electrochemical Machining" (Year: 2020).*
Wikipedia page to "Electrolysis" (Year: 2004).*
Wayback Machine to Wikipedia page to "Electrolysis" (Year: 2020).*
Korean Notice of Allowance dated Sep. 10, 2018 for corresponding Korean Application No. 10-2016-0151719.
Korean Office Action dated Jan. 4, 2018 in connection with the counterpart Korean Patent Application No. 10-2016-0151719.

* cited by examiner

【Fig. 1】
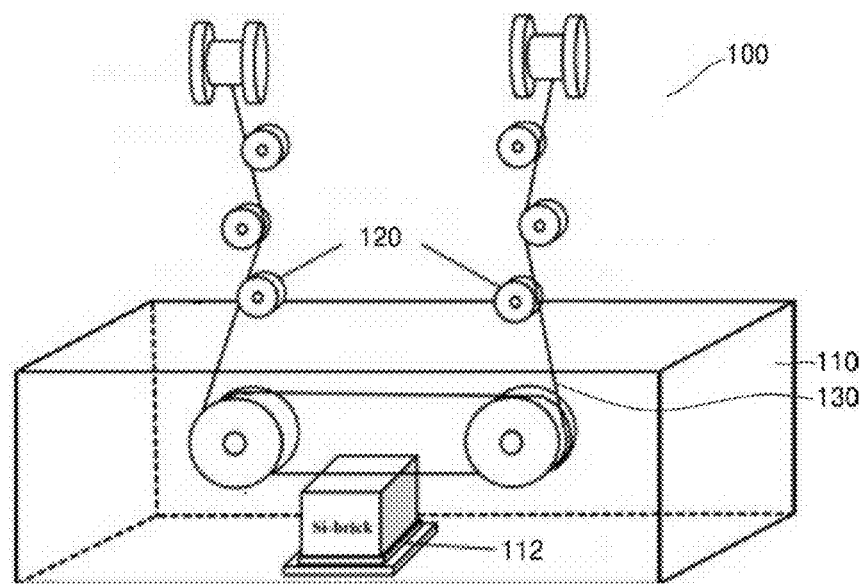
【Fig. 2】
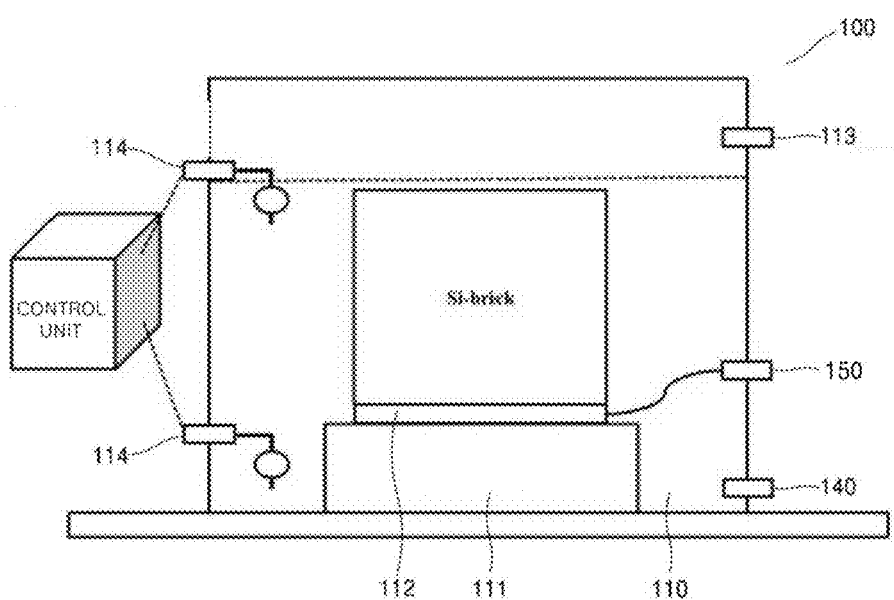

[Fig. 3A]
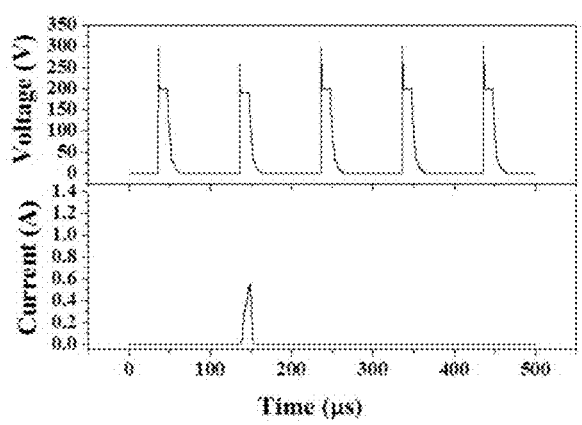
[Fig. 3B]
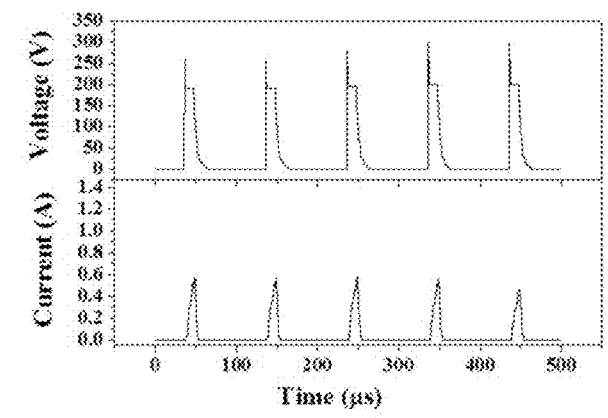

[Fig. 4A]
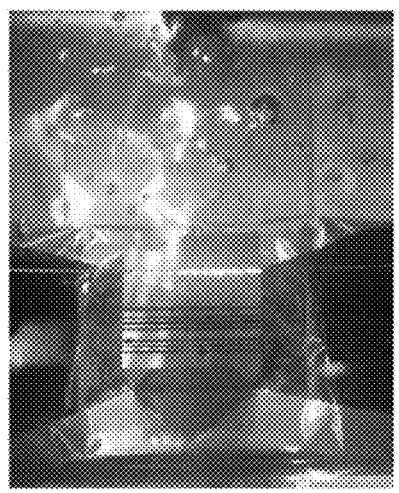
[Fig. 4B]
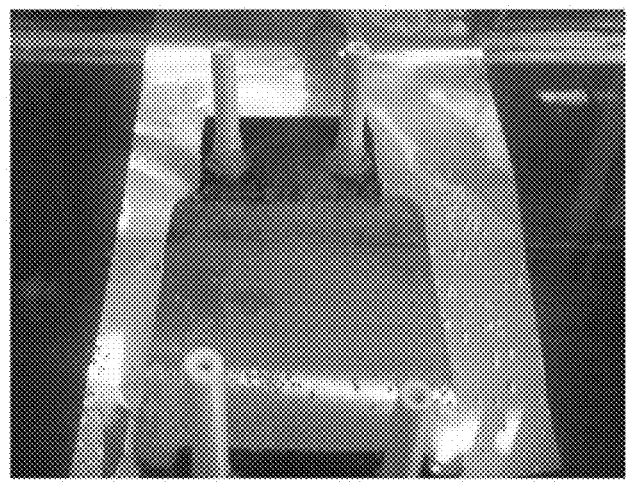

[Fig. 5]
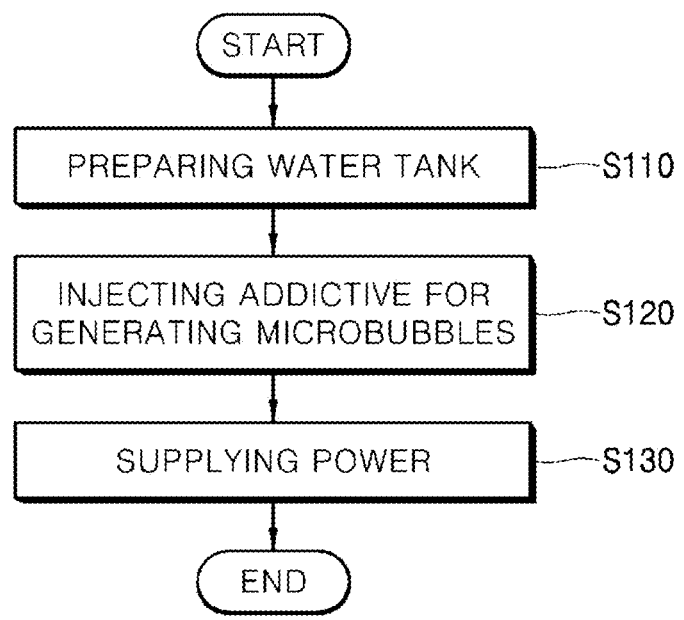

[Fig. 6A]
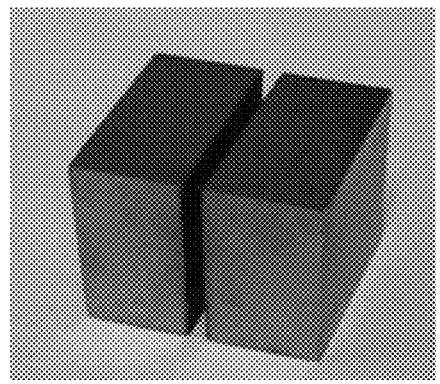
[Fig. 6B]
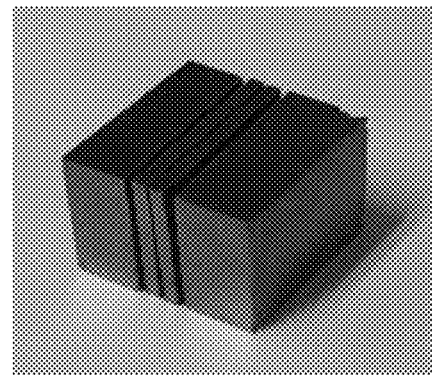
[Fig. 6C]
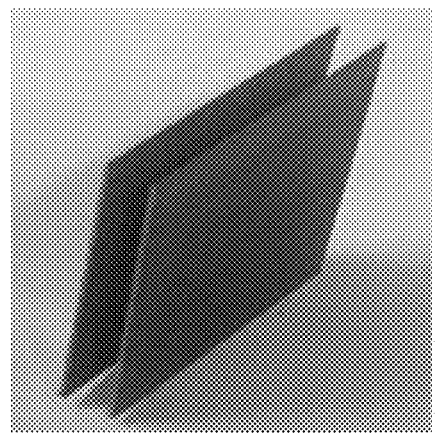

[Fig. 7]
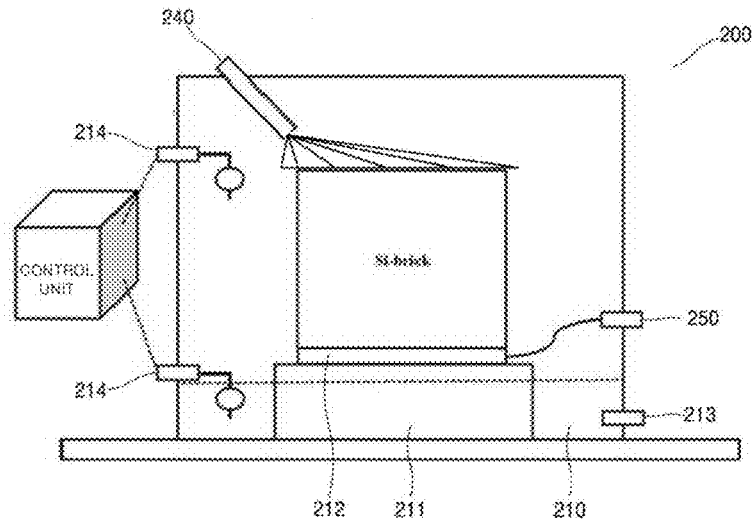
[Fig. 8]
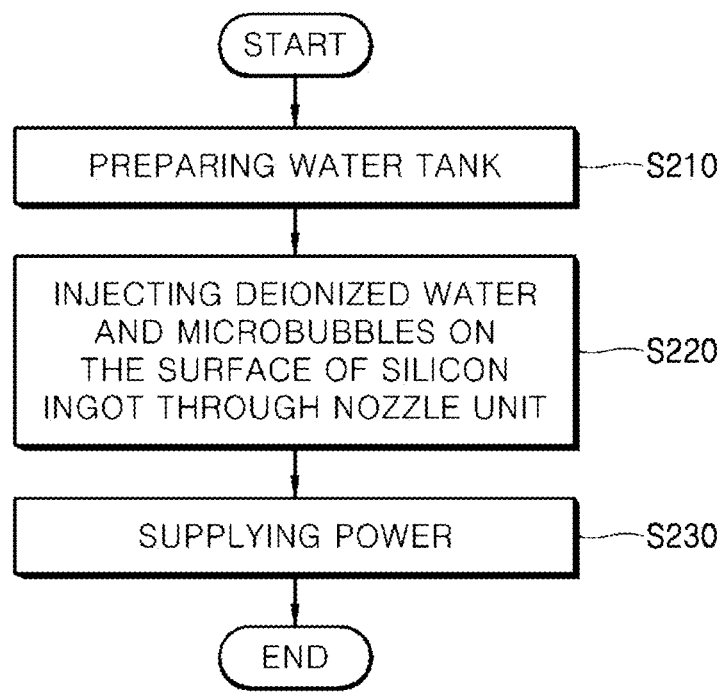

[Fig. 9A]
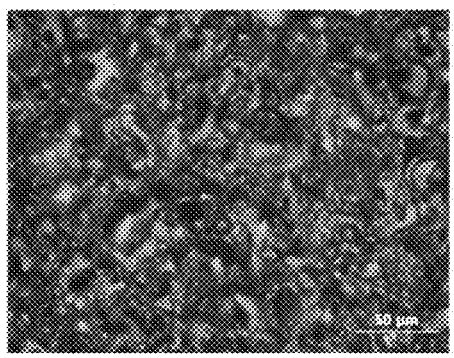
[Fig. 9B]
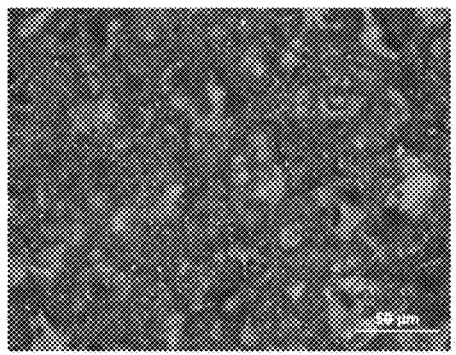

[Fig. 10A]
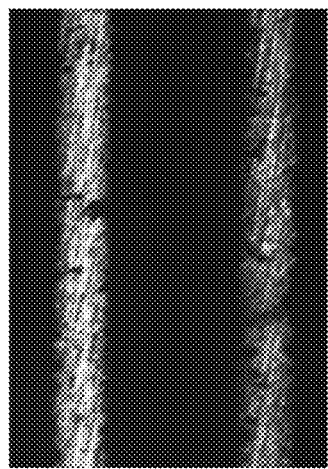
[Fig. 10B]
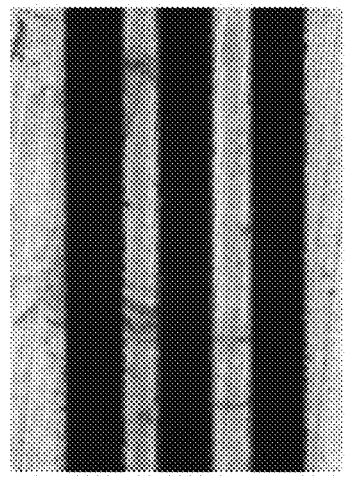

[Fig. 11A]
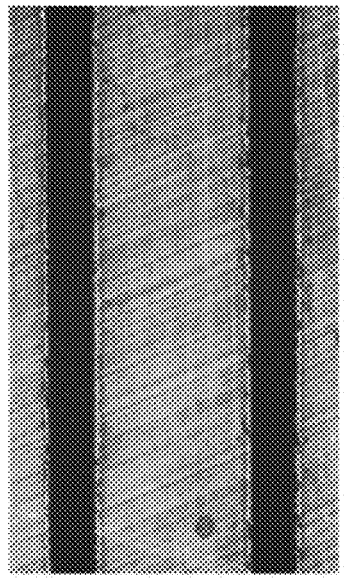
Gap distance ≅ 65 μm
[Fig. 11B]
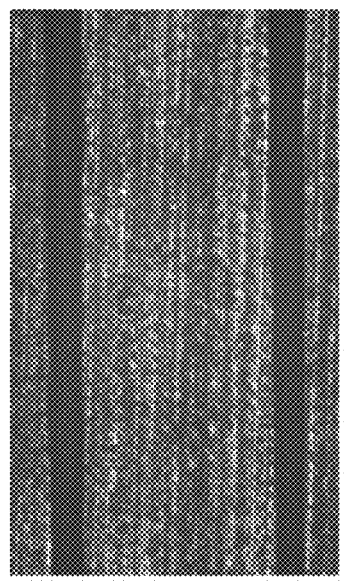
Gap distance ≅ 6.5 μm

[Fig. 11C]
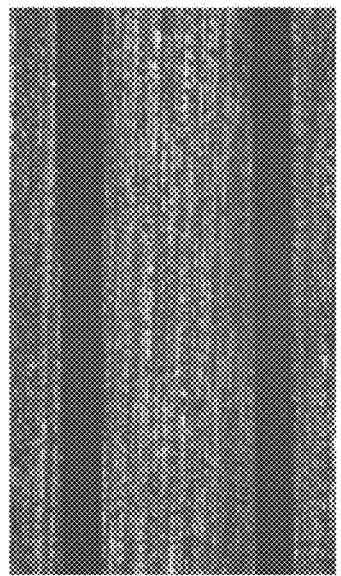
Gap distance ≂ 30 μm

[Fig. 12]
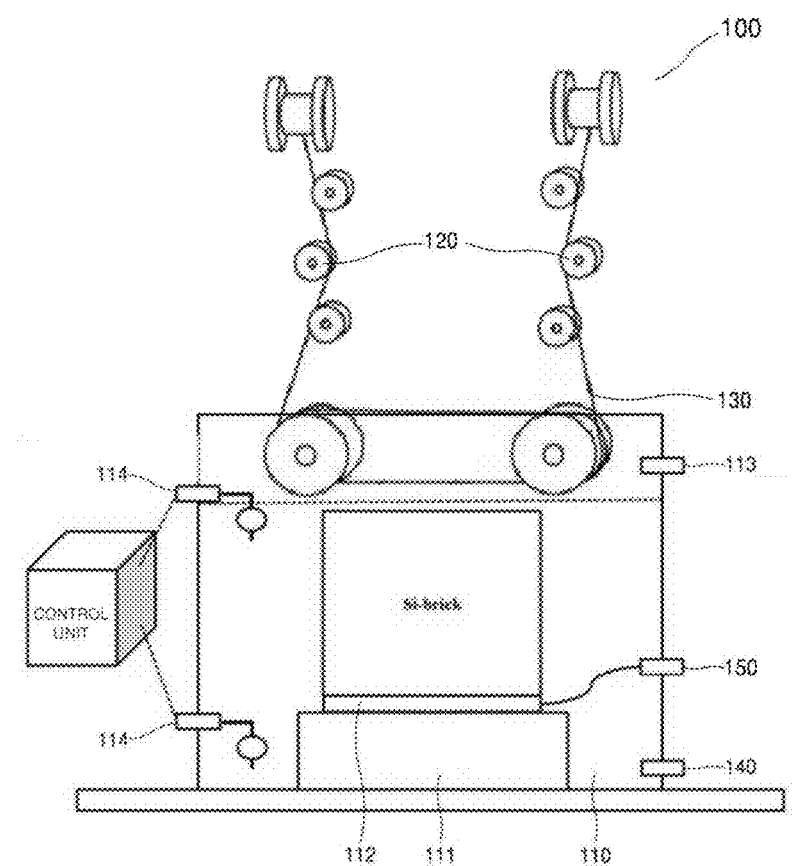

[Fig. 13]
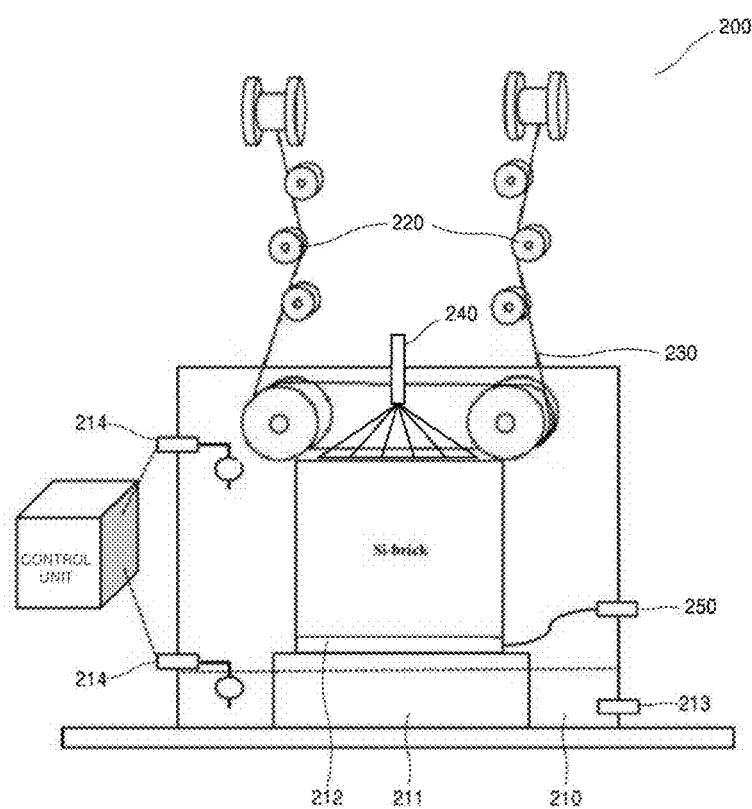

SILICON INGOT SLICING APPARATUS USING MICROBUBBLES AND WIRE ELECTRIC DISCHARGE MACHINING

CROSS-REFERENCE TO RELATED APPLICATIONS

This application claims priority to Korean Patent Application No. 10-2016-0151719 filed on Nov. 15, 2016, and Provisional Application No. 62/438,043 filed on Dec. 22, 2016, all the benefits accruing there from under 35 U.S.C. § 119, the contents of which is incorporated by reference in its entirety.

BACKGROUND

1. Field of the Invention

The present invention relates to a silicon ingot slicing apparatus and more particularly, to a silicon ingot slicing apparatus capable of slicing silicon ingots in various forms such as blocks or wafers using microbubbles and wire electric discharge machining, and a silicon ingot slicing method thereof.

2. Description of the Related Art

A method of slicing a silicon ingot by using a wire employs a mechanical method of rubbing a polishing slurry or a diamond coated wire against a silicon ingot, to thus slice the silicon ingot. Since the frictional force generated at the mechanical method may cause various defects on the surface of the silicon ingot, it is necessary to remove additional surface defects by using mechanical surface abrasion such as grinding, lapping, and polishing, and chemical surface abrasion such as etching and cleaning.

Meanwhile, when the silicon ingot is sliced by using a wire electric discharge machining (WEDM) apparatus, such defects may be reduced. However, due to the high electric resistance of silicon, the voltage required for slicing the silicon ingot is a high voltage of 100 V to 500 V, and thus thermal damage may be caused on the surface of the silicon ingot by the high-temperature melting heat generated at the time of slicing the silicon ingot. In addition, when slicing silicon ingots, a high energy of 100 V or above is a major cause of increasing a kerf-loss.

Research has been conducted to reduce the electrical resistance of silicon by attaching or coating a conductive material to a silicon ingot as a method of reducing the electrical resistance of the silicon to reduce the voltage, but there is a limit to improve the slicing efficiency such as a slicing speed. In addition, there is a method of slicing a silicon ingot through an electrochemical reaction or etching, not a discharge, but the method has a slicing speed of 1/10 compared with a slicing speed of general electric discharge machining, and thus the slicing efficiency is not excellent.

The background art related to the present invention is Korean Patent Application Publication No. 10-2016-0053825 published on May 13, 2016, which discloses an apparatus for and a method of slicing semiconductors and non-conductors by using wire electric discharge machining.

SUMMARY

It is an object of the present invention to provide a silicon ingot slicing apparatus which reduces an applied voltage to 100 V or less and improves the quality of a sliced surface of a silicon ingot by using microbubbles and wire electric discharge machining.

It is another object of the present invention to provide a method of slicing a silicon ingot by using the silicon ingot slicing apparatus.

In order to accomplish one of the above objects, there is provided a silicon ingot slicing apparatus using microbubbles and wire electric discharge machining according to an aspect of the present invention, the silicon ingot slicing apparatus comprising: a water tank containing a jig attached to a lower surface of a silicon ingot, a conductive adhesive layer adhered between the silicon ingot and the jig, and deionized water (DIW); an electrode unit connected to the silicon ingot; a wire unit for slicing the silicon ingot while being transported in the vertical direction of the silicon ingot by a wire driving unit; an additive injection unit for injecting an additive for generating microbubbles into the water tank; and a power supply unit for supplying power to the electrode and the wire so that arc discharge and electrolysis are performed between the silicon ingot and the wire unit, wherein microbubbles are generated on the surfaces of both the electrode unit and the silicon ingot by the additive for generating microbubbles, at the time of an application of a voltage to the electrode unit and the wire unit.

Preferably but not necessarily, the additive for generating microbubbles may be a compound comprising one or both of H and OH groups.

Preferably but not necessarily, the microbubbles may have an average particle diameter of 40 to 60 μm.

Preferably but not necessarily, the silicon ingot slicing apparatus further comprises: an outlet unit for discharging the deionized water (DIW) and the microbubbles from the water tank for controlling the amount of the deionized water (DIW) and the microbubbles; and an electrical conductivity measuring sensor unit for measuring the electrical conductivity of the deionized water.

Preferably but not necessarily, the power supply unit may apply a voltage of 25 V or more as a DC pulse voltage to the electrode unit and the wire unit.

According to another aspect of the present invention, there is provided a silicon ingot slicing apparatus using microbubbles and wire electric discharge machining, the silicon ingot slicing apparatus comprising: a water tank containing a jig attached to a lower surface of a silicon ingot and a conductive adhesive layer adhered between the silicon ingot and the jig; an electrode unit connected to the silicon ingot; a wire unit for slicing the silicon ingot while being transported in the vertical direction of the silicon ingot by a wire driving unit; a nozzle unit for injecting deionized water (DIW) and microbubbles onto the surface of the silicon ingot; and a power supply unit for supplying power to the electrode unit and the wire unit so that an arc discharge is generated between the silicon ingot and the wire unit, wherein the microbubbles are supplied to the surfaces of both the electrode unit and the silicon ingot by the nozzle unit.

Preferably but not necessarily, the silicon ingot slicing apparatus further comprises: an outlet unit for discharging the deionized water (DIW) and the microbubbles from the water tank for controlling the amount of the deionized water (DIW) and the microbubbles; and an electrical conductivity measuring sensor unit for measuring the electrical conductivity of the deionized water.

Preferably but not necessarily, the nozzle unit may be a diffusion type nozzle unit or a slit type nozzle unit.

Preferably but not necessarily, the microbubbles may have an average particle diameter of 5 to 80 μm.

Preferably but not necessarily, the power supply unit may apply a voltage of 25 V or more as a DC pulse voltage to the electrode unit and the wire unit.

In order to accomplish the other of the above objects, there is provided a silicon ingot slicing method using microbubbles and wire electric discharge machining according to another aspect of the present invention, the silicon ingot slicing method comprising: (a) preparing a water tank containing a jig attached to a lower surface of a silicon ingot, a conductive adhesive layer adhered between the silicon ingot and the jig, and deionized water (DIW), wherein an electrode unit is connected to the silicon ingot; (b) injecting an additive for generating microbubbles into the water tank through an additive injection unit; and (c) supplying power to the electrode unit and a wire unit so that arc discharge and electrolysis are performed between the silicon ingot and the wire unit, so that the wire unit slices the silicon ingot while being transported in the vertical direction of the silicon ingot, wherein microbubbles are generated on the surfaces of both the electrode unit and the silicon ingot by the additive for generating microbubbles, at the time of an application of a voltage to the electrode unit and the wire unit.

Preferably but not necessarily, the additive for generating microbubbles may be a compound comprising one or both of H and OH groups.

Preferably but not necessarily, the microbubbles may have an average particle diameter of 40 to 60 μm.

Preferably but not necessarily, the power supply unit may apply a voltage of 25 V or more as a DC pulse voltage to the electrode unit and the wire unit.

In order to accomplish the other of the above objects, there is provided a silicon ingot slicing method using microbubbles and wire electric discharge machining according to another aspect of the present invention, the silicon ingot slicing method comprising: (a) preparing a water tank containing a jig attached to a lower surface of a silicon ingot, and a conductive adhesive layer adhered between the silicon ingot and the jig, wherein an electrode is connected to the silicon ingot; (b) injecting deionized water (DIW) and microbubbles onto the surface of the silicon ingot through a nozzle unit; and (c) supplying power to the electrode unit and a wire unit so that arc discharge is performed between the silicon ingot and the wire unit, to thus make the wire unit slice the silicon ingot while being transported in the vertical direction of the silicon ingot, wherein microbubbles are supplied on the surfaces of both the electrode unit and the silicon ingot by the nozzle unit.

Preferably but not necessarily, the nozzle unit may be a diffusion type nozzle unit or a slit type nozzle unit.

Preferably but not necessarily, the deionized water (DIW) and microbubbles injected from the nozzle unit can be injected onto the surface of the silicon ingot at an average speed of 50 L/min or less.

Preferably but not necessarily, the microbubbles may have an average particle diameter of 5 to 80 μm.

Preferably but not necessarily, the power supply unit may apply a voltage of 25 V or more as a DC pulse voltage to the electrode unit and the wire unit.

BRIEF DESCRIPTION OF THE DRAWINGS

The above and other objects, features and advantages of the present invention will be more apparent from the following detailed description taken in conjunction with the accompanying drawings, in which:

FIG. 1 is a perspective view showing a silicon ingot slicing apparatus including a wire according to an embodiment of the present invention;

FIG. 2 is a cross-sectional view of a silicon ingot slicing apparatus according to an embodiment of the present invention, together with a control unit which is shown in a perspective view;

FIGS. 3A and 3B are graphs for comparing discharging frequencies showing the results of measurement with an oscilloscope, in which a conventional silicon ingot slicing apparatus using only a wire electric discharge machining process is used in FIG. 3A and a silicon ingot slicing apparatus according to an embodiment of the present invention is used in FIG. 3B;

FIG. 4A shows a photograph showing bubbles generated by a high temperature of 200° C. or higher during conventional electric discharge machining and FIG. 4B shows a photograph showing bubbles generated by an electrode reaction according to an embodiment of the present invention;

FIG. 5 is a flowchart illustrating a silicon ingot slicing method according to an embodiment of the present invention;

FIGS. 6A to 6C are photographs showing silicon sliced by using a silicon ingot slicing apparatus and method according to the embodiment of the present invention;

FIG. 7 is a cross-sectional view of a silicon ingot slicing apparatus according to another embodiment of the present invention, together with a control unit which is shown in a perspective view;

FIG. 8 is a flowchart illustrating a silicon ingot slicing method according to another embodiment of the present invention;

FIG. 9A is a photograph showing a cut surface of silicon sliced by using conventional wire electric discharge machining, and FIG. 9B is a photograph showing a cut surface of silicon sliced by using microbubbles and wire electric discharge machining of the present invention;

FIG. 10A is a photograph showing a cut surface of silicon sliced by using conventional wire electric discharge machining, and FIG. 10B is a photograph showing a cut surface of silicon sliced by using microbubbles and wire electric discharge machining of the present invention;

FIG. 11A shows a cut width of silicon sliced at 150V by using conventional wire electric discharge machining, FIG. 11B shows a cut width of silicon sliced at 50V by using an additive for generating microbubbles according to the present invention, and FIG. 11C shows a cut width of silicon sliced at 80 V by injecting microbubbles through a nozzle unit according to the present invention;

FIG. 12 is a cross-sectional view of the silicon ingot slicing apparatus of FIG. 2 including a wire, together with a control unit and a wire driving unit which are shown in a perspective view; and FIG. 13 is a cross-sectional view of the silicon ingot slicing apparatus of FIG. 7 including a wire, together with a control unit and a wire driving unit which are shown in a perspective view.

DETAILED DESCRIPTION OF THE INVENTION

The advantages and features of the present invention and the method of achieving the advantages and features will become apparent with reference to the embodiments described in detail below with reference to the accompanying drawings. The present invention may, however, be embodied in many different forms and should not be construed as limited to the embodiments set forth herein. Rather, these embodiments are provided so that this disclosure will be thorough and complete, and will be provided to fully convey the scope of the invention to those skilled in the art, and the invention is defined only by the scope of the claims. Like reference numerals refer to like elements throughout the specification.

Hereinafter, a silicon ingot slicing apparatus using microbubbles and wire electric discharge machining according to a preferred embodiment of the present invention and a silicon ingot slicing method thereof will be described in detail with reference to the accompanying drawings.

The present invention relates to a technique for slicing crystalline silicon by an electrochemical slicing method rather than a conventional mechanical slicing method. A silicon ingot may be monocrystalline silicon formed into a single mass to be used for a semiconductor application. A silicon ingot of a cylindrical shape is manufactured by filling and melting poly-silicon in a crucible, and controlling the speed and the temperature of the melted poly-silicon.

The cross-section of the silicon ingot may be formed in a quadrangular shape and thus may be also applied to a solar cell.

As shown in FIGS. 1, 2, and 12, a silicon ingot slicing apparatus 100 using microbubbles and wire electric discharge machining according to an embodiment of the present invention includes a water tank 110, an electrode unit 120, a wire unit 130, an addictive injection unit 140, and a power supply unit 150.

In the water tank 110, a jig 111 attached to a lower surface of a silicon ingot (Si-brick), a conductive adhesive layer 112 attached between the silicon ingot and the jig, and deionized water (DIW) are accommodated. The conductive adhesive layer may be formed of an adhesive composition including a conductive polymer, an adhesive monomer, or the like. The deionized water contained in the water tank 110 is an electrolytic dielectric material, and is maintained to have predetermined concentration and purity by an electrical conductivity measurement sensor unit 114 connected to the water tank 110. In order to increase the slicing efficiency of the silicon ingot, it is preferable to keep the height of the deionized water so that the silicon ingot is completely contained in the deionized water. The electrical conductivity measuring sensor unit 114 may be located at both upper and lower portions with respect to the height direction of the water tank 110.

The electrode unit 120 is connected to the silicon ingot and is supplied with power by the power supply unit 150. Here, a positive (+) electrode may be connected to the silicon ingot, and a negative (−) electrode may be connected to the wire unit 130.

The wire unit 130 is transported in the vertical direction of the silicon ingot by a wire driving unit to thus slice the silicon ingot. The silicon ingot is fixed in the water tank 110. While the power supply unit 150 supplies power to the wire unit 130, the wire unit 130 moves vertically by the wire driving unit including rollers to slice the silicon ingot. The vertical direction means a direction passing upper and lower portions with respect to the height direction of the silicon ingot. The wire unit 130 may be made of a metal having high electrical conductivity, but is not limited thereto.

The additive injection unit 140 serves as a passage for injecting an additive for generating microbubbles into the water tank 110. The additive injection unit 140 may supply the additive and the deionized water together. The additive for generating microbubbles is supplied to the deionized water and when a voltage is applied to the electrode unit and the wire unit in the form of DC pulses of 25 V or more, the additive accelerates the electrolysis of water, thereby generating microbubbles on the surfaces of both the electrode unit and the silicon ingot. As a result of a dielectric breakdown phenomenon caused by the microbubbles generated, the frequency of electric discharge increases, and an applied voltage capable of slicing the silicon ingot can be reduced to 100 V or less, so that defects on the cut surface can be prevented. The microbubbles mean that bubbles such as nitrogen or air have a specific size in the deionized water.

Also, dielectric breakdown of a liquid such as deionized water has to occur before the liquid is electrically discharged, that is, sparked or arced, and the generated microbubbles act as a starting point for causing dielectric breakdown, thereby increasing an electric discharge frequency. This can be seen in the graphs of FIGS. 3A and 3B. The dielectric breakdown is an intrinsic property determined by a dielectric constant of a dielectric material.

As described above, an average particle diameter of the microbubbles produced through the electrode reaction may be 40 to 60 μm. Referring to FIGS. 4A and 4B, it can be seen that the average particle diameter of the microbubbles produced through the electrode reaction is smaller than the average particle diameter (1 to 5 mm) of the bubbles generated by the high temperature of 200° C. or more during the electric discharge machining. This means that a small amount of gases of H and OH groups was generated around the electrode unit by the following reaction formulas.

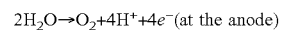
$$2H_2O \rightarrow O_2 + 4H^+ + 4e^- \text{(at the anode)}$$

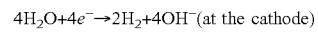
$$4H_2O + 4e^- \rightarrow 2H_2 + 4OH^- \text{(at the cathode)} \quad \text{[Reaction Formulas]}$$

In order to accelerate the reaction, it is preferable to apply a voltage of 25 V or more, and an additive for generating microbubbles may be added in an amount of 0.1 to 5 M based on a molar concentration of deionized water. The additive for generating microbubbles is a compound containing at least one of H and OH groups. For example, hydrofluoric acid (HF), acetic acid ($CH_3COOH$), nitric acid ($HNO_3$), potassium hydroxide (KOH), sodium hydroxide (NaOH), or the like may be used as the addictive.

The power supply unit 150 supplies power to the electrode unit and the wire unit so that arc discharge and electrolysis are performed between the silicon ingot and the wire unit 130. When the voltage is applied to the electrode unit and the wire unit, microbubbles are generated on the surface of the electrode unit and the surface of the silicon ingot by the additive.

As shown in FIGS. 1 and 2, when the silicon ingot is completely impregnated in the deionized water, the additive may be additionally supplied through the additive injection unit 140 during slicing.

The silicon ingot slicing apparatus 100 further includes an outlet unit 113 for discharging the deionized water from the water tank 110 thereby adjusting the amount of the deionized water and an electric conductivity measuring sensor unit 114 for measuring the electric conductivity of the deionized water.

Referring to FIG. 5, the silicon ingot slicing method using microbubbles and wire electric discharge machining according to an embodiment of the present invention includes a step S110 of preparing a water tank, a step S120 of injecting an additive for generating microbubbles and a step S130 for supplying power to an electrode unit and a wire unit.

First, a water tank 110 containing a jig 111 attached to a lower surface of a silicon ingot, a conductive adhesive layer 112 attached between the silicon ingot and the jig, and deionized water (DIW) is provided. The positive (+) electrode 120 may be connected to the silicon ingot.

Next, the additive for generating microbubbles is injected into the water tank through the additive injection unit 140. The microbubble-generating additive may be added in an amount of 0.1 to 5 M based on the molar concentration of the deionized water, as described above.

Next, power is supplied to the electrode unit 120 and the wire unit 130 so that arc discharge and electrolysis are performed between the silicon ingot and the wire unit 130. As a result, microbubbles are generated on the surface of the electrode unit 120 and the surface of the silicon ingot, and the silicon ingot is sliced while the wire unit 130 moves in the vertical direction of the silicon ingot. FIGS. 6A to 6C are photographs showing the cut silicon.

The deionized water may be discharged through the outlet unit 113, or concentration or purity of deionized water stored in the water tank 110 may be measured through the electric conductivity measuring sensor unit 114, while the silicon ingot is being cut.

As shown in FIGS. 7 and 13, a silicon ingot slicing apparatus 200 using microbubbles and wire electric discharge machining according to another embodiment of the present invention includes a water tank 210, an electrode unit 220, a wire unit 230, a nozzle unit 240 and a power supply unit 250.

In the water tank 210, a jig 211 attached to a lower surface of a silicon ingot and a conductive adhesive layer 212 attached between the silicon ingot and the jig are accommodated. The conductive adhesive layer may be formed from an adhesive composition including a conductive polymer, an adhesive monomer, and the like. The deionized water may be stored in the water tank 210 as much as the height of the jig 211, but the present invention is not limited thereto.

The electrode unit 220 is connected to the silicon ingot and is supplied with power by the power supply unit 250. A positive (+) electrode may be connected to the silicon ingot.

The wire unit 230 is transported in the vertical direction of the silicon ingot by the wire driving unit to slice the silicon ingot. The silicon ingot is fixed in the water tank 210. While the power supply unit 150 supplies power to the wire unit 230, the wire unit 230 moves vertically by the wire driving unit including rollers to slice the silicon ingot. The vertical direction means a direction passing upper and lower portions with respect to the height direction of the silicon ingot. The wire unit 230 may be made of a metal having high conductivity, but is not limited thereto.

The nozzle unit 240 injects deionized water (DIW) and microbubbles onto the surface of the silicon ingot. When deionized water (DIW) and microbubbles are directly injected into silicon and a DC pulse voltage of 25 V or more is applied, the dielectric breakdown phenomenon can be induced on the surface of the electrode unit and the surface of the silicon ingot, thereby increasing the electric discharge frequency. The supplied microbubbles can reduce an applied voltage capable of slicing the silicon ingot to 100 V or less, thereby preventing defects on the sliced surface. The deionized water and the dielectric breakdown are as described above.

The average particle diameter of the microbubbles injected into the silicon ingot through the nozzle unit 240 may be 5 to 80 μm and may include bubbles such as nitrogen or air having a size of 5 to 80 μm in the deionized water. The density of the microbubbles contained in the deionized water may be determined by an injection rate through the nozzle unit. The density of the bubbles may be about 5 to 30% in a ratio of a volume of the deionized water versus a volume of microbubbles, when a diameter of bubbles is 40 to 50 μm. When a volume fraction is less than 5%, the effects on the drop of the applied voltage by the microbubbles and the electric discharge frequency may be insufficient. Meanwhile, if the volume fraction exceeds 30%, the cooling effect of the deionized water is reduced, and the disconnection of the wire and the defect of the cut surface can be increased sharply.

The nozzle unit 240 may be a diffusion type nozzle unit or a slit type nozzle unit. The diffusion type nozzle unit is used to cut an ingot area of 150 mm or more in width and length by using a thick wire having a thickness of 100 μm or more. That is, in the slicing apparatus using wire electric discharge machining, when a process is performed in a state where a plurality of wires are wound on the wire guide rollers, the diffusion type nozzle unit is efficient. The deionized water (DIW) and the microbubbles are injected through the holes of the diffusion type nozzle unit, and the average diameter of the holes of the diffusion type nozzle unit may be approximately 50 to 100 μm.

The slit type nozzle unit is used to cut an ingot area of 150 mm or more in width and length by using a wire having a thickness of 100 μm or less. That is, in the slicing apparatus using the wire electric discharge machining, the slit type nozzle unit is used when a process is carried out in a state where wires are wound in three or less strands. The deionized water (DIW) and the microbubbles are injected through the holes of the slit type nozzle unit, and the average diameter of the holes of the slit type nozzle unit may be approximately 10 to 50 μm.

The power supply unit 250 supplies power to the electrodes and the wire so that arc discharge and electrolysis are performed between the silicon ingot and the wire unit 230. As the power is supplied to the wire unit 230, the wire unit 230 is moved in the vertical direction of the silicon ingot, and thus the silicon ingot is sliced. FIGS. 6A to 6C are photographs showing the cut silicon.

By the nozzle unit, microbubbles are generated on the surface of the electrode unit and the surface of the silicon ingot.

The silicon ingot slicing apparatus 200 may further include an outlet unit 213 for discharging deionized water (DIW) and microbubbles from the water tank 210 for controlling the amount of the deionized water (DIW) and the microbubbles, and an electrical conductivity measurement sensor unit 214 for measuring an electrical conductivity of the deionized water.

Referring to FIG. 8, the silicon ingot slicing method using microbubbles and wire electric discharge machining according to another embodiment of the present invention includes the steps of preparing a water tank (S210), injecting deionized water (DIW) and microbubbles onto the surface of a silicon ingot through a nozzle unit (S220) and supplying power (S230).

First, a water tank 210 containing a jig 211 attached to a lower surface of a silicon ingot, and a conductive adhesive layer 212 attached between the silicon ingot and the jig, is provided. An electrode unit 220 may be connected to the silicon ingot.

Next, deionized water (DIW) and microbubbles are injected onto the surface of the silicon ingot through the nozzle unit 240. The deionized water and the microbubbles are injected in the form of bubbles such as nitrogen or air having a size of 5 to 80 μm in the deionized water. The nozzle unit 240 is formed of a diffusion type nozzle unit or a slit type nozzle unit as described above.

The deionized water (DIW) and microbubbles ejected from the nozzle unit 240 can be injected onto the surface of the silicon ingot at an average speed of 50 L/min or less, and the density of the microbubbles contained in the deionized water can be determined by the injection rater of the deionized water (DIW) and microbubbles. When the injection rate exceeds 50 L/min, microbubbles are excessively supplied on the surface of the silicon ingot, and the wire disconnection and defects on the cut surface are rapidly increased, so that it is difficult to expect an increase in electric discharge efficiency and a reduction in a slicing loss.

Next, power is supplied to the electrode unit 220 and the wire unit 230 so that arc discharge and electrolysis are performed between the silicon ingot and the wire unit 230. While microbubbles are supplied on the surface of the electrode unit 220 and the surface of the silicon ingot by the nozzle unit and the wire unit 230 moves in the vertical direction of the silicon ingot, the silicon ingot is cut as shown in FIGS. 6A to 6C.

Here, by applying a voltage of 25 V or more as a DC pulse voltage to accelerate the electrolysis, the applied voltage capable of slicing the silicon ingot by the microbubbles generated on the surface of the electrode unit 220 and the surface of the silicon ingot may be reduced, and the quality of the cut surface may be improved.

The deionized water and the microbubbles can be discharged through the outlet unit 213, or the concentration, purity, and the like of the deionized water stored in the water tank 210 can be measured through the electric conductivity measuring sensor unit 214, during slicing the silicon ingot.

Referring to FIGS. 3A and 3B, although the distances between the electrodes in the electrode unit are the same under the same applied voltage, it can be seen that the electric discharge frequency of FIG. 3B using the silicon ingot slicing apparatus and method according to an embodiment of the present invention is much higher than that of FIG. 3A using the conventional silicon ingot slicing apparatus and method using the convention wire electric discharge machining. These results show that the microbubbles have caused the dielectric breakdown phenomenon to occur more smoothly.

In addition, referring to FIGS. 9A, 9B, 10A, and 10B, it can be confirmed that the quality of the cut surface of silicon cut by using the microbubbles and the wire electric discharge machining of the present invention (FIGS. 9B and 10B) is more excellent than the quality of the cut surface of silicon cut by using the conventional wire electric discharge machining (FIGS. 9A and 10A).

In addition, the slicing loss in FIG. 11B is reduced by 1/10 compared to the slicing loss in FIG. 11A, and the slicing loss in FIG. 11C is reduced by 1/2 compared to the slicing loss in FIG. 11A.

As described above, it is preferable to slice the silicon ingot by using the two slicing methods proposed according to the present invention, but when comparing the result that the microbubbles injected through the nozzle unit 240 have an average particle diameter of 5 to 80 μm with the result that the microbubbles produced by injecting the additive for generating microbubbles through the nozzle unit 140 have an average particle diameter of 40 to 60 μm, it can be seen that the uniformity of the bubble particle diameter is somewhat lowered in the case that microbubbles are injected directly onto the surface of the silicon ingot through the nozzle unit 240. As a result, the uniformity of the electric discharge may be lowered when the case of directly injecting microbubbles onto the surface of the silicon ingot is compared to the case of injecting microbubbles by using the additive.

In other words, it is more preferable to cut the silicon ingot by using a method of injecting the additive and the deionized water through the additive injecting unit 140.

As shown in FIGS. 2 and 7, in the silicon ingot slicing apparatuses having the two types of configurations of the present invention, the measurement sensor unit, the power supply unit, and the like can be operated and controlled by a control unit, but the present invention is not limited thereto.

As described above, the silicon ingot slicing method using the silicon ingot slicing apparatus of the present invention is advantageous in that slicing is performed at a voltage as low as 100 V or less as compared with a conventional method of slicing a silicon ingot by using a high voltage of 100 V or more. This shows that the microbubbles generated on the surface of the electrode unit and the surface of the silicon ingot induce the dielectric breakdown phenomenon, thereby improving the electric discharge frequency and reducing the applied voltage capable of slicing the silicon ingot by the microbubbles.

Therefore, in the present invention, a compound containing H or OH groups in deionized water is used as an additive for generating microbubbles to induce an electrolysis reaction of water, thereby generating bubbles on the surface of the electrode unit and the surface of the silicon ingot. Accordingly, when slicing a silicon ingot in a water tank in which deionized water and microbubbles are mixed, the electric discharge efficiency can be improved and the slicing loss can be reduced. It has a cleaning effect that the surface of the produced wafer is cleaned with deionized water and microbubbles as soon as the ingot is cut.

That is, as the wafer fabrication process and the cleaning process are performed at the same time, there is no contamination on the wafer surface, so that no additional cleaning process is required, to thereby improve the quality of the manufactured wafer and increase the production amount.

The silicon ingot slicing apparatus according to the present invention is configured to add an additive for producing microbubbles to deionized water or to inject microbubbles and deionized water onto the surface of a silicon ingot through a nozzle unit. Such a silicon ingot slicing apparatus can perform arc discharge machining and electrolytic machining and generate microbubbles composed of H or OH groups on the surfaces of both an electrode unit and the silicon ingot through an application of a voltage of 25 V or more.

Electric discharge efficiency can be increased and a slicing loss can be lowered due to the microbubbles. Thus, defects on the silicon cut surface can be prevented and the quality of the cut surface can be improved, in comparison to a conventional silicon ingot slicing method where a high voltage of 100 V or more is used.

In addition, the silicon ingot slicing method using the silicon ingot slicing apparatus according to the present invention generates microbubbles on the surfaces of both the electrode unit and the silicon ingot through an electrolytic reaction in which decomposition is accomplished at a voltage of 25 V or more, thereby reducing an applied voltage capable of slicing the silicon ingot to 100 V or less.

According to the silicon ingot slicing apparatus and method of the present invention, crystalline silicon can be cut into various shapes such as blocks and wafers, to thus improve slicing efficiency and the quality of the cut surface.

While the present invention has been described in connection with what is presently considered to be practical exemplary embodiments, it is to be understood that the invention is not limited to the disclosed embodiments, but, on the contrary, it will be understood by those skilled in the art that the present invention may be embodied in other specific forms without departing from the spirit or essential characteristics thereof. It is therefore to be understood that the embodiments described above are illustrative in all aspects and not restrictive.

What is claimed is:

1. A silicon ingot slicing apparatus using microbubbles and wire electric discharge machining, the silicon ingot slicing apparatus comprising:
   a water tank containing a jig attached to a lower surface of a silicon ingot, a conductive adhesive layer adhered between the silicon ingot and the jig, and deionized water (DIW);
   an electrode connected to the silicon ingot;
   a wire for slicing the silicon ingot while being transported in a first direction by a wire driver;
   an additive injection passage for injecting an additive for generating the microbubbles into the water tank; and
   a power supply for supplying power to the electrode and the wire so that arc discharge and electrolysis are performed between the silicon ingot and the wire,
   wherein the silicon ingot slicing apparatus is configured to:
      generate the microbubbles on the surfaces of both the electrode and the silicon ingot by the additive, during application of a DC pulse voltage above 25V and less than 100V, by the power supply, to the electrode and the wire, wherein the generated microbubbles cause a dielectric breakdown of the DIW and an increase in electric discharge frequency of the silicon ingot slicing apparatus, and
      slice the silicon ingot by moving the wire in the first direction during the application of the DC pulse voltage, the DC pulse voltage generating the arc discharge between the silicon ingot and the wire,
   wherein an entirety of the silicon ingot is contained in the DIW; and
   wherein the microbubbles have an average particle diameter of 40 to 60 μm and a volume of the microbubbles is between 5% and 30% a volume of the DIW.

2. The silicon ingot slicing apparatus of claim 1, wherein the additive for generating microbubbles is a compound comprising one or both of H and OH groups.

3. The silicon ingot slicing apparatus of claim 1, further comprising:
   an outlet for discharging the DIW and the microbubbles from the water tank for controlling the amount of the DIW and the microbubbles; and
   an electrical conductivity measuring sensor for measuring the electrical conductivity of the DIW.

4. A silicon ingot slicing apparatus using microbubbles and wire electric discharge machining, the silicon ingot slicing apparatus comprising:
   a water tank containing a jig attached to a lower surface of a silicon ingot and a conductive adhesive layer adhered between the silicon ingot and the jig;
   an electrode connected to the silicon ingot;
   a wire for slicing the silicon ingot while being transported in a first direction of the silicon ingot by a wire driver;
   a nozzle assembly for injecting deionized water (DIW) and microbubbles onto the surface of the silicon ingot; and
   a power supply for supplying power to the electrode and the wire so that an arc discharge is generated between the silicon ingot and the wire,
   wherein the silicon ingot slicing apparatus is configured to:
      generate the microbubbles to surfaces of both the electrode and the silicon ingot by the nozzle assembly during application of a DC pulse voltage above 25V and less than 100V, by the power supply, to the electrode and the wire, wherein the generated microbubbles cause a dielectric breakdown of the DIW and an increase in electric discharge frequency of the silicon ingot slicing apparatus, and
      slice the silicon ingot by moving the wire in the first direction during the application of the DC pulse voltage, the DC: pulse voltage generating the arc discharge between the silicon ingot and the wire,
   wherein an entirety of the silicon ingot is contained in the DIW, and
   wherein the microbubbles have an average particle diameter of 5 to 80 μm and a volume of the microbubbles is between 5% and 30% a volume of the DIW.

5. The silicon ingot slicing apparatus of claim 4, further comprising:
   an outlet for discharging the DIW and the microbubbles from the water tank for controlling the amount of the DIW and the microbubbles; and
   an electrical conductivity measuring sensor for measuring the electrical conductivity of the DIW.

6. The silicon ingot slicing apparatus of claim 4, wherein the nozzle assembly is a diffusion type nozzle assembly or a slit type nozzle assembly.

7. The silicon ingot slicing apparatus of claim 4, wherein the microbubbles have an average particle diameter of 40-50 μm.

8. The silicon ingot slicing apparatus of claim 7, wherein the nozzle assembly includes a plurality of holes, and
   wherein an average diameter of the holes of the nozzle assembly is between 50 and 100 μm.

9. The silicon ingot slicing apparatus of claim 1, wherein the microbubbles have an average particle diameter of 40-50 μm.

* * * * *